(12) United States Patent
Sisbot et al.

(10) Patent No.: US 12,573,064 B2
(45) Date of Patent: Mar. 10, 2026

(54) MONOCULAR DEPTH ESTIMATION PARAMETER ASSISTANCE AND AUGMENTATION

(71) Applicant: TOYOTA MOTOR ENGINEERING & MANUFACTURING NORTH AMERICA, INC., Plano, TX (US)

(72) Inventors: Emrah Akin Sisbot, Mountain View, CA (US); Seyhan Ucar, Mountain View, CA (US); Takamasa Higuchi, Mountain View, CA (US); Yongkang Liu, Mountain View, CA (US); Kentaro Oguchi, Mountain View, CA (US)

(73) Assignees: TOYOTA MOTOR ENGINEERING & MANUFACTURING NORTH AMERICA, INC., Plano, TX (US); TOYOTA JIDOSHA KABUSHIKI KAISHA, Toyota (JP)

( * ) Notice: Subject to any disclaimer, the term of this patent is extended or adjusted under 35 U.S.C. 154(b) by 307 days.

(21) Appl. No.: 18/161,587

(22) Filed: Jan. 30, 2023

(65) Prior Publication Data

US 2024/0257368 A1 Aug. 1, 2024

(51) Int. Cl.
| | |
|---|---|
| *G06T 7/50* | (2017.01) |
| *G06V 10/25* | (2022.01) |
| *G06V 20/56* | (2022.01) |

(52) U.S. Cl.
CPC ............... *G06T 7/50* (2017.01); *G06V 10/25* (2022.01); *G06V 20/588* (2022.01); *G06T 2207/30256* (2013.01)

(58) Field of Classification Search
CPC . G06T 7/50; G06T 2207/30256; G06V 10/25; G06V 20/588
See application file for complete search history.

(56) References Cited

U.S. PATENT DOCUMENTS

| | | | | |
|---|---|---|---|---|
| 1,952,010 A | * | 3/1934 | Gregory .................... | F23B 1/00 110/254 |
| 2015/0139533 A1 | * | 5/2015 | Wu ....................... | H04N 13/122 382/154 |

(Continued)

FOREIGN PATENT DOCUMENTS

| | | | | |
|---|---|---|---|---|
| JP | 2017142829 A | 8/2017 | | |
| WO | WO-2022266131 A1 | * 12/2022 | ............. | H04N 23/71 |

*Primary Examiner* — Dhaval V Patel
(74) *Attorney, Agent, or Firm* — SHEPPARD, MULLIN, RICHTER & HAMPTON LLP; Daniel N. Yannuzzi

(57) ABSTRACT

Systems and methods are provided to determine optimal (image analysis) parameters for generating or adapting/adjusting a monocular depth estimation (MDE) depth map based on various factors, such as vehicle operating conditions, environmental conditions, road conditions, etc. After determining the optimal parameters to use, the optimal parameters can be stored on a cloud server or an edge server along with the vehicle location for use when another vehicle approaches the location to perform MDE without needing to independently determine the optimal parameters to use. Moreover, the use of such optimal image analysis parameters, enable a richer/enhanced view of the environment/area around or about a vehicle, where image analysis parameters may be used to more accurately interpret or otherwise characterize a depth map.

20 Claims, 9 Drawing Sheets

(56) References Cited

U.S. PATENT DOCUMENTS

| | | | |
|---|---|---|---|
| 2015/0304625 A1 | 10/2015 | Seto | |
| 2019/0340729 A1* | 11/2019 | Haefner | G06T 5/50 |
| 2020/0104612 A1 | 4/2020 | Chen | |
| 2021/0112193 A1* | 4/2021 | Ter Haar | G06T 7/20 |
| 2022/0148206 A1 | 5/2022 | Guizilini | |
| 2022/0215577 A1* | 7/2022 | Kohata | G06T 7/74 |
| 2022/0351225 A1* | 11/2022 | Girija | G06N 3/08 |
| 2023/0281769 A1* | 9/2023 | Nanjegowd | G06T 5/50 |
| | | | 382/284 |

* cited by examiner

GENERATE DEPTH MAP FROM AN IMAGE OF A SCENE
700

IDENTIFY PORTIONS OF THE SCENE CORRESPONDING TO A ROAD SEGMENT
702

IDENTIFY A POINT OF INTEREST IN THE SCENE
704

ADJUST THE DEPTH MAP TO ONE OF EMPHASIZE OR DE-EMPHASIZE AT LEAST ONE OF THE IDENTIFIED POINT OF INTEREST AND THE ROAD SEGMENT
708

DETERMINE/STORE OPTIMAL IMAGE ANALYSIS PARAMETERS FOR THE SCENE
706

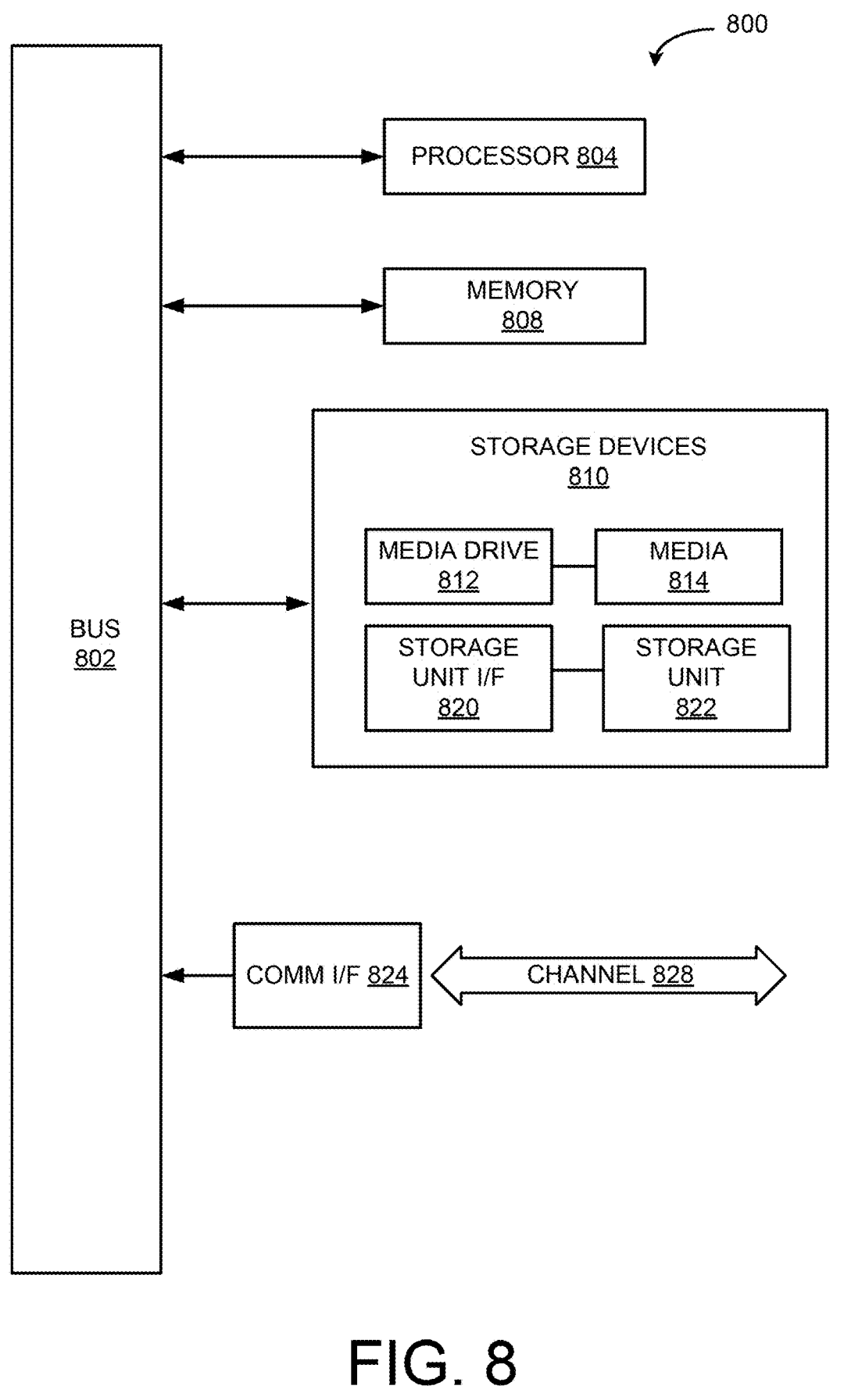

800

PROCESSOR 804

MEMORY
808

STORAGE DEVICES
810

MEDIA DRIVE
812

MEDIA
814

STORAGE
UNIT I/F
820

STORAGE
UNIT
822

BUS
802

COMM I/F 824

CHANNEL 828

FIG. 8

MONOCULAR DEPTH ESTIMATION PARAMETER ASSISTANCE AND AUGMENTATION

TECHNICAL FIELD

The present disclosure relates generally to image processing, and in particular, some implementations may relate to generating/providing enhanced views about a vehicle, such a rear view of the vehicle, using monocular depth estimation in conjunction with optimal parameters regarding image/road-related information, and in some embodiments, parking/vehicle operational assistance may be provided based on such enhanced views.

DESCRIPTION OF RELATED ART

Monocular depth estimation (MDE) refers to a technique for estimating pixel depth in an image. For example, a camera may capture a color image and convert the color image to a depth map. The depth map may be a gray scale image, where each gray scale value corresponds to a distance between the camera (that captured the color image) and a corresponding pixel. MDE may be used in the vehicular context to perceive road characteristics, objects/obstacles that are/may be encountered by the vehicle, etc. For example, an autonomous vehicle may utilize MDE to determine distances to objects in order to perform driving functions, such as evasive maneuvering or navigation planning. A non-autonomous vehicle may use MDE to determine distances to objects and present this data to a driver in order to assist the driver in performing driving maneuvers.

BRIEF SUMMARY OF THE DISCLOSURE

According to various embodiments of the disclosed technology, a method comprises generating a depth map from an image of a scene, identifying a portion of the scene corresponding to a road segment, and identifying a point of interest in the scene. The method further comprises at least one of adjusting the depth map to one of emphasize or de-emphasize at least one of the identified point of interest and the road segment, and determining an optimal image analysis parameter for the scene.

In some embodiments, the method further comprises extracting the road segment from the adjusted depth map. In some embodiments, adjusting of the depth map to de-emphasize the road segment is performed pursuant to extraction of the road segment from the depth map upon identification of the road segment.

In some embodiments, the method further comprises prioritizing the identification of the point of interest relative to one or more other points of interest.

In some embodiments, the method further comprises adjusting the depth map to emphasize the identified point of interest comprises highlighting the identified point of interest in a manner that visually emphasizes the identified point of interest to an operator of a vehicle, wherein the vehicle will encounter the identified point of interest while traversing the road segment.

In some embodiments, the generating of the depth map comprises generating a depth map using a MDE component based on the image of the scene received from a camera of a vehicle. In some embodiments, the method further comprises determining an operational parameter associated with the camera. In some embodiments, the generating of the optimal image analysis parameter comprises generating a parameter value to offset at least one of the operational parameter and at least one aspect of the generated depth map. In some embodiments, use of the optimal image analysis parameter increases accuracy of the generated depth map.

According to various embodiments of the disclosed technology, a method comprises receiving, at a first vehicle, an optimal image analysis parameter output by a remote server, the first vehicle traversing a road segment, the optimal image analysis parameter having been generated pursuant to a second vehicle having previously traversed the road segment. The method further comprises generating, at the first vehicle, a depth map from an image of a scene, and adjusting the depth map to one of emphasize or de-emphasize at least one of an identified point of interest in the scene, and the road segment using the optimal image analysis parameter.

In some embodiments, adjusting of the depth map to de-emphasize the road segment is performed pursuant to extraction of the road segment from the depth map upon identification of the road segment.

In some embodiments, the method further comprises prioritizing identification of the point of interest relative to one or more other points of interest.

In some embodiments, adjusting the depth map to emphasize the identified point of interest comprises highlighting the identified point of interest in a manner that visually emphasizes the identified point of interest to an operator of the first vehicle, wherein the first vehicle will encounter the identified point of interest while traversing the road segment.

In some embodiments, generating the depth map comprises generating a depth map using a MDE component based on the image of the scene received from a camera of the first vehicle. In some embodiments, the method further comprises determining an operational parameter associated with the camera. In some embodiments, the generating of the optimal image analysis parameter comprises generating a parameter value to offset at least one of the operational parameter and at least one aspect of the generated depth map. In some embodiments, use of the optimal image analysis parameter increases accuracy of the generated depth map.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 8 is an example computing component that may be used to implement various features of embodiments described in the present disclosure.

Figure 1:
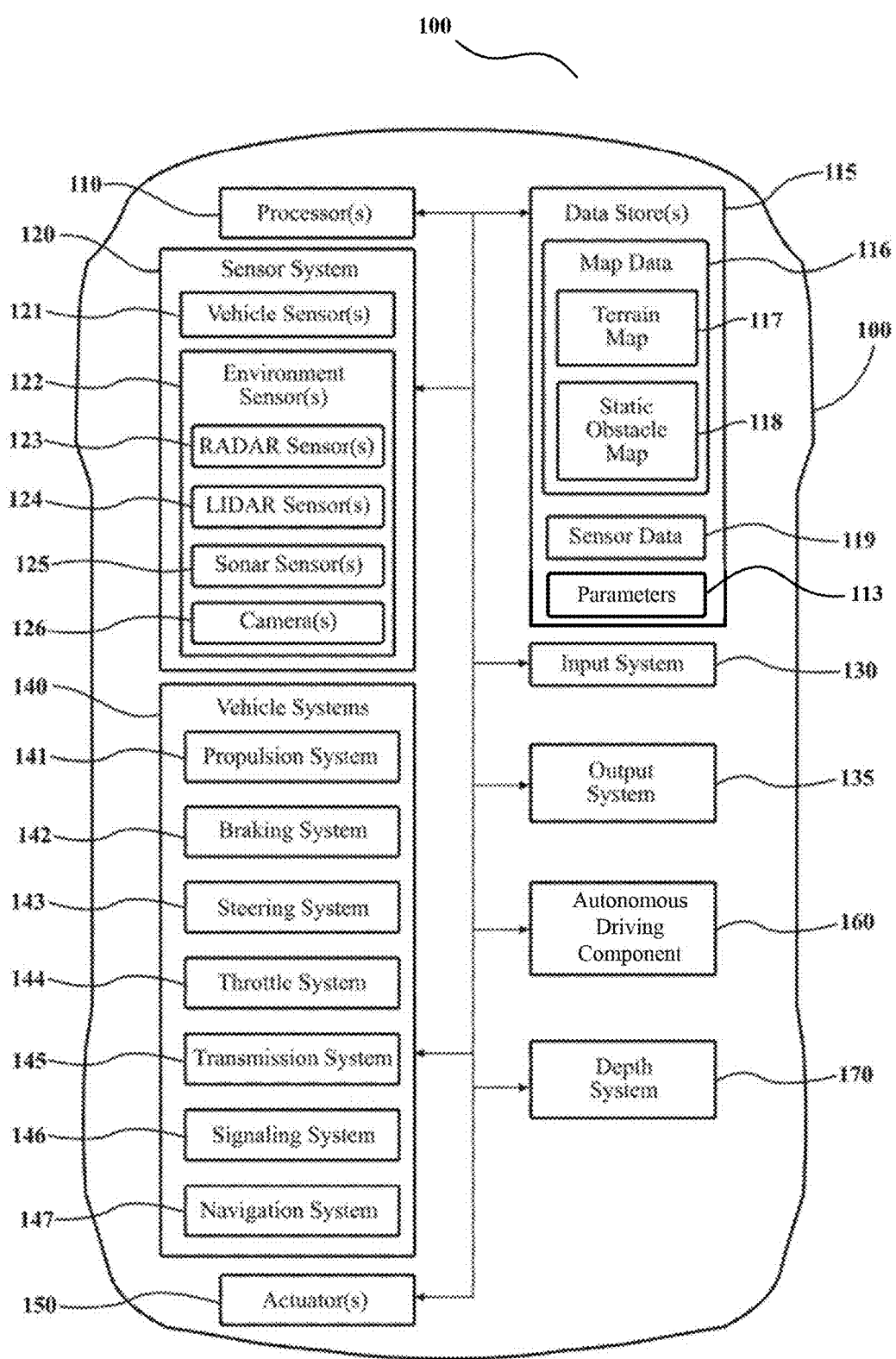
FIG. 1 illustrates one embodiment of a vehicle within which systems and methods disclosed herein may be implemented.

The figures are not exhaustive and do not limit the present disclosure to the precise form disclosed.

DETAILED DESCRIPTION

As alluded to above, MDE can be used in various contexts, including use by a vehicle/for a vehicle to perceive one or more aspects of a road or road segment, driving scene/scenario, etc. However, in order to perform MDE, various parameters are utilized to determine a depth map from an image. For a vehicle system, the ideal/optimal (or preferred) parameters to use may vary depending on the vehicle's location or other factors. Such parameters comprise information that may be correlated to/used to characterize one or more relationships between a captured image and the environment in which/during which the captured image was obtained, which can include the device(s)/mechanism(s) used to obtain the captured image. That is, parameters may comprise vehicle dynamics-related information, vehicle feature(s) status, driving behavior-related information, etc., and can be used for normalizing a depth map or depth map information. For example, parameters, such as focal length may be used to calibrate vehicle sensors or perform calculations needed for MDE. Different parameters may be utilized depending on the driving environment of the vehicle, the time of day, the lighting, the weather, or other factors. Such parameters can be used to interpret, more accurately, any machine learning predictions/outputs from MDE operations.

Accordingly, embodiments of the technology disclosed herein may determine optimal (image analysis) parameters to use to generate/adapt an MDE depth map based on any such factors. After determining the optimal parameters to use, the vehicle system may transmit the determined optimal parameters to a cloud server or an edge server along with the vehicle location. The cloud server or the edge server may receive the determined optimal parameters and the vehicle location and may store the received parameters associated with the received location. When another vehicle approaches the location, the cloud server or the edge server may send the parameters for that location to the other vehicle. The other vehicle may then use the parameters sent by the cloud server or the edge server to perform MDE without needing to independently determine the optimal parameters to use.

Moreover, the use of such optimal image analysis parameters, enable a richer/enhanced view of the environment/area around or about a vehicle. For example, regarding a backup scenario, to assist drivers in maneuvering a vehicle backwards, backup camera, parking sonar, and bird's eye view technology are typically provided in conventionally-configured vehicles. However, because backup cameras are typically monocular, there is no distance measurement or estimate, forcing a driver to rely on his/her own experience/interpretation to determine how close/far away an object(s) may be. Parking sensors are not positioned nor are they typically sensitive enough to detect objects or obstacles that are undetectable relative to the parking sensor's placement (typically on a bumper), e.g., objects lower than/outside the "view" of the parking sensor, or that are "thin" such as certain roadway infrastructure poles. Bird's eye view technology is still measurement-less and is the result of stitching together views from existing cameras (that are already deficient). The use of conventionally-implemented MDE, as described above, is also measurement-less.

Thus, in accordance with some embodiments, image analysis parameters may be used to more accurately interpret or otherwise characterize the first/original depth map (generated by conventionally-implemented MDE) relative to conditions that may have impacted/may have an impact on the first/original depth map. For example, consider a situation where a vehicle is backing up (moving in reverse) while parking. Based on conventional MDE, a depth map reflecting obstacles/elements in a captured image or scene may be generated. In accordance with some embodiments, however, the depth map may be normalized or adjusted pursuant to the image analysis parameters. For example, characteristics of a sensor or camera capturing the image may be used to convert or translate pixel values of depth into real-world values of distance to/from the vehicle and the object(s) of interest in an image.

It should be noted that the terms "optimize" and "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

Referring to FIG. 1, an example of a vehicle 100 with which embodiments may be implemented or utilized is illustrated. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may be any robotic device or form of powered transport that, for example, proceeds through an environment according to assessed aspects of the environment, and thus benefits from the functionality discussed herein. In further embodiments, the vehicle 100 may be a statically mounted device, an embedded device, or another device that uses monocular images to derive depth information about a scene.

It should be understood that, in various embodiments, it may not be necessary for the vehicle 100 to have all of the elements shown in FIG. 1. The vehicle 100 can have some combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are illustrated as being located within the vehicle 100, it will be understood that one or more of these elements can be located external to the vehicle 100. Further, the elements shown may be physically separated by large distances and provided as remote services (e.g., cloud-computing services, software-as-a-service (SaaS), etc.).

In some instances, vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, vehicle 100 is an autonomous vehicle. As used herein, "autonomous vehicle" refers to a vehicle that operates in an autonomous mode. "Autonomous mode" refers to navigating and/or maneuvering vehicle 100 along a travel route using one or more computing systems to control vehicle 100 with minimal or no input from a human driver. In one or more embodiments, vehicle 100 is highly automated or completely automated. In one embodiment, vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of vehicle 100 along a travel route.

Vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include, but are not limited to trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, environmental conditions, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.). In some embodiments, input system 130 may comprise communications components (not shown), e.g., wireless communications components such as a cellular or WiFi receiver, for receiving information from another source, such as a traffic service, radio provider, and the like, while output system 135 may, in some embodiments, comprise a transmitter for transmitting data, such as sensor data to a cloud or edge server (or other entity or data repository).

The vehicle 100 can include one or more vehicle systems 140. Various examples of the one or more vehicle systems

140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110, the depth system 170 (described below), and/or the autonomous driving component(s) 160 can be operatively connected to communicate with the various vehicle systems 140 and/or individual components thereof. For example, processor(s) 110 and/or the autonomous driving component(s) 160 can be in communication to send and/or receive information from the various vehicle systems 140 to control the movement, speed, maneuvering, heading, direction, etc. of the vehicle 100. The processor(s) 110, the depth system 170, and/or the autonomous driving component(s) 160 may control some or all of these vehicle systems 140 and, thus, may be partially or fully autonomous.

The processor(s) 110, the depth system 170, and/or the autonomous driving component(s) 160 can be operatively connected to communicate with the various vehicle systems 140 and/or individual components thereof. For example, returning to FIG. 1, the processor(s) 110, the depth system 170, and/or the autonomous driving component(s) 160 can be in communication to send and/or receive information from the various vehicle systems 140 to control the movement, speed, maneuvering, heading, direction, etc. of the vehicle 100. The processor(s) 110, the depth system 170, and/or the autonomous driving component(s) 160 may control some or all of these vehicle systems 140.

The processor(s) 110, the depth system 170, and/or the autonomous driving component(s) 160 may be operable to control the navigation and/or maneuvering of the vehicle 100 by controlling one or more of the vehicle systems 140 and/or components thereof. For instance, when operating in an autonomous mode, the processor(s) 110, the depth system 170, and/or the autonomous driving component(s) 160 can control the direction and/or speed of the vehicle 100. The processor(s) 110, the depth system 170, and/or the autonomous driving component(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving component(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more components, at least some of which are described herein. The components can be implemented as computer-readable program code that, when executed by a processor 110, implement one or more of the various processes described herein. One or more of the components can be a component of the processor(s) 110, or one or more of the components can be executed on and/or distributed among other processing systems to which the processor(s) 110 is operatively connected. The components can include instructions (e.g., program logic) executable by one or more processor(s) 110. Alternatively, or in addition, one or more data store 115 may contain such instructions.

In one or more arrangements, one or more of the components described herein can include artificial or computational intelligence elements, e.g., neural network, fuzzy logic or other machine learning algorithms. Further, in one or more arrangements, one or more of the components can be distributed among a plurality of the components described herein. In one or more arrangements, two or more of the components described herein can be combined into a single components.

The vehicle 100 can include one or more autonomous driving components 160. The autonomous driving component(s) 160 can be configured to receive data from the sensor system 120 and/or any other type of system capable of capturing information relating to the vehicle 100 and/or the external environment of the vehicle 100. In one or more arrangements, the autonomous driving component(s) 160 can use such data to generate one or more driving scene models. The autonomous driving component(s) 160 can determine position and velocity of the vehicle 100. The autonomous driving component(s) 160 can determine the location of obstacles, obstacles, or other environmental features including traffic signs, trees, shrubs, neighboring vehicles, pedestrians, etc.

The autonomous driving component(s) 160 can be configured to receive, and/or determine location information for obstacles within the external environment of the vehicle 100 for use by the processor(s) 110, and/or one or more of the components described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving component(s) 160 either independently or in combination with the depth system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving component(s) 160 can be configured to implement determined driving maneuvers. The autonomous driving component(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving component(s) 160 can be configured to execute various vehicle functions and/or to transmit data to, receive data from, interact with, and/or control the vehicle 100 or one or more systems thereof (e.g., one or more of vehicle systems 140).

As noted above, vehicle 100 may include a depth system 170 that functions to process monocular images and provide depth estimates for an environment (e.g., objects, surfaces, etc.) depicted therein. Moreover, while depicted as a standalone component, in one or more embodiments, the depth system 170 is integrated with the autonomous driving component 160, the camera 126, or another component of the vehicle 100.

Figure 2:
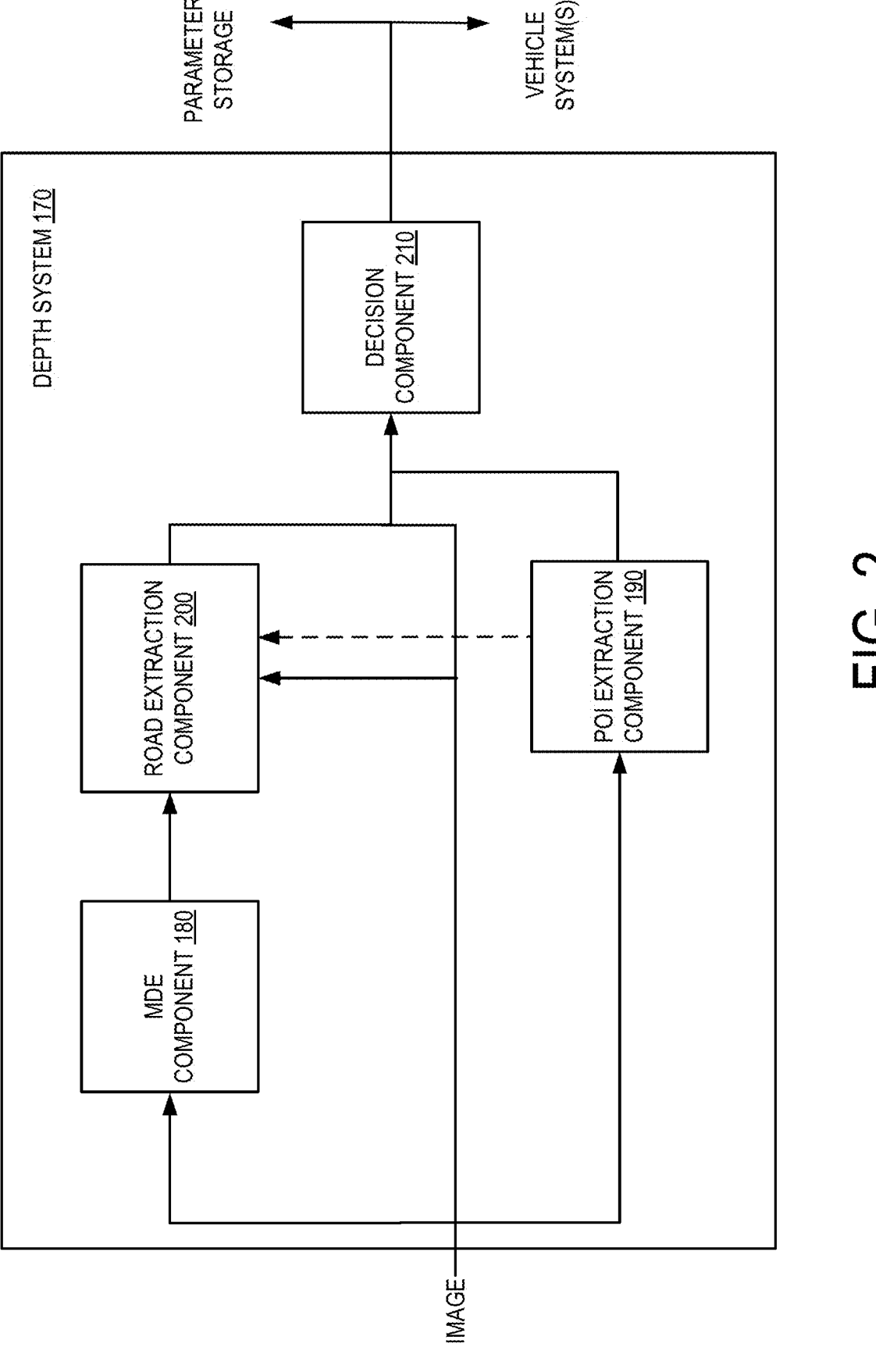
FIG. 2 illustrates an example architecture of a depth system in accordance with some embodiments.

With reference to FIG. 2, depth system 170 may comprise an MDE component 180. MDE component 180 may receive as input, a color image, such as that received from one or more vehicle sensors 121, e.g., camera(s) 126, and outputs/ generates a depth map using machine learning (described in greater detail, below). It should be understood that a depth map can refer to a gray scale image (as alluded to above), where each pixel value of the gray scale image is proportional to the distance of an object/portion of an object represented by that pixel to the camera that captured the color image. However, and again, a typical depth map only portrays relative distance, not a measured/estimated distance or distance associated with an actual distance unit, e.g., meters.

Depth system 170 may include a point of interest (POI) extraction component 190. POI extraction component (which will be described in greater detail below) detects objects, features, areas, or other points of interest in a captured image. Depth system 170 may further comprise a road extraction component 200. As will be described in greater detail below, road extraction component 200 may detect and extract part(s) of a depth map (output by MDE component 180) or color image output by camera(s) 126 that correspond to a portion of roadway. It should be understood that road extraction need not necessarily focus on actual areas of roadway, but instead can refer to any part of roadway/roadway experience, e.g., physical structures such as buildings, dividers, actual sections of the road, etc.

Together, information regarding extracted road segments, extracted POI information, and depth maps, may be considered by decision component 210. Decision component 210 can operate to determine what parameters to adjust, and what values to assign to such parameters given the context/ scenario in which vehicle 100 is operating. Decision component 210 may output such parameters/parameter values, which ultimately, can be used by one or more vehicle systems 140 to generate/obtain driving/parking assistance information for a driver/occupant of vehicle 100, trigger warnings or notifications, or instruct one or more vehicle systems 140 to take some action, such as braking, etc.

Use of road extraction component 200 allows decision component 210 to filter out any aspect(s) or portion(s) of the depth map that does not reflect some object, obstacle, or other point of interest, or is otherwise not relevant. In this way, such road segment(s) may be treated as "noise" and removed (extracted or de-emphasized) to avoid or mitigate the chance for error when assessing what vehicle 100 (or an operator thereof) should do based on a generated depth map. Moreover, extracted POIs may be "highlighted" or otherwise identified in a manner that may be beneficial to a driver/occupant of vehicle 100. For example, conventionally-implemented MDE may result in a gray-scale depth map. Because the entirety of the depth map is in gray-scale, the definition or recognition of POIs, especially by a driver/occupant, may be hindered. However, by extracting POIs, such POIs may be presented in a way that makes such POIs more readily recognizable.

In some embodiments, road extraction component 190 may recognize road segments for the purpose of associating the depth map and/or other information, such as any extracted POIs, with particular image analysis parameters. That is, road extraction component 190 may operate to identify information about the road/road segment in order to identify the road/road segment at issue, and ultimately remove/extract that road/road segment from the depth map if unneeded in a given scenario or context. As discussed above, image analysis parameters may include information about conditions relevant to or impacting vehicle 100, e.g., driving environment/conditions, lighting at a particular location, and so on. In some embodiments, road extraction component may utilize or rely on other sensors or input information (e.g., navigation system 147, or input received at input system 130) to determine the location or positioning of vehicle 100 at a particular moment or during some duration. POI extraction component 190 may be utilized as well, in certain embodiments, to identify objects or other POI that may be used to identify vehicle 100's location, or to identify POI that may impact or have an effect on an image analysis parameter. For example, POI extraction component 190 may identify an object(s) suggesting an identified road segment is undergoing construction, which may impact visibility, and which in turn, may impact distance calculations/determinations based on a generated depth map output by MDE component 180, due to dusty environmental conditions impacting camera operation. In such embodiments, the output of decision component 210, may be transmitted to some parameter storage, e.g., remote or cloud/edge-based data store. In some embodiments, such optimal parameters 113 (FIG. 1) may stored in data store 115, which in some embodiments, as explained above, may be remote relative to vehicle 100 (or at least a portion of data store 115 for storing parameters 113 may be remotely implemented).

Figure 3A:
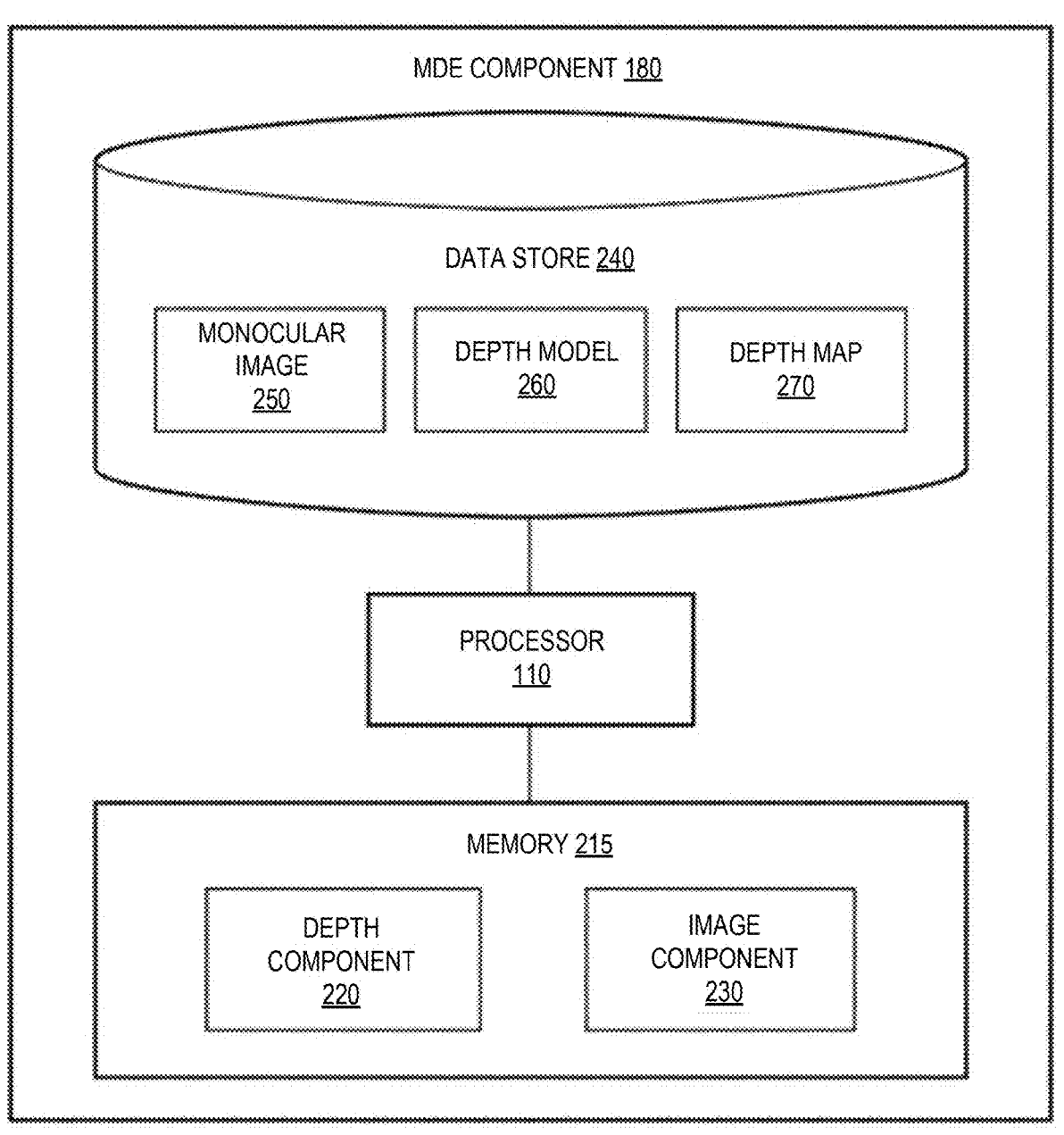
FIG. 3A illustrates an example architecture monocular depth estimation (MDE) component in accordance with some embodiments.

With reference to FIG. 3A, one embodiment of MDE component 180 is further illustrated. MDE component 180 is shown as including a processor 110. Accordingly, the processor 110 may be a part of MDE component 180 or MDE component 180 may access the processor 110 through a data bus or another communication path. In one or more embodiments, the processor 110 is an application-specific integrated circuit (ASIC) that is configured to implement functions associated with a depth component 220 and an image component 230. In general, the processor 110 is an electronic processor such as a microprocessor that is capable of performing various functions as described herein. In one embodiment, MDE component 180 includes a memory 210 that stores the depth component 220 and the image component 230. The memory 210 is a random-access memory (RAM), read-only memory (ROM), a hard disk drive, a flash memory, or other suitable memory for storing the components 220 and 230. The components 220 and 230 are, for example, computer-readable instructions that when executed by the processor 110 cause the processor 110 to perform the various functions disclosed herein.

In one embodiment, MDE component 180 includes a data store 240. The data store 240 is, in one embodiment, an electronic data structure stored in the memory 215 or another data store and that is configured with routines that can be executed by the processor 110 for analyzing stored data, providing stored data, organizing stored data, and so on. Thus, in one embodiment, the data store 240 stores data used by the components 220 and 230 in executing various functions. In one embodiment, the data store 240 includes monocular image(s) 250, a depth model 260, and a depth map(s) 270 along with, for example, other information that is used by the components 220 and 230.

The monocular image 250 is, for example, an image from camera 126 that encompasses a field-of-view about the vehicle 100 of at least a portion of the surrounding environment. That is, the image 250 is, in one approach, generally limited to a subregion of the surrounding environment. As such, the image 250 may be of a forward-facing (i.e., the direction of travel) 60, 90, 120-degree FOV, a rear/side facing FOV, or some other subregion as defined by the characteristics of the camera 126. In further aspects, the camera 126 is an array of two or more cameras that capture multiple images of the surrounding environment and stitch the images together to form a comprehensive 360-degree view of the surrounding environment.

In either case, the image 250 itself includes visual data of the FOV that is encoded according to an image standard (e.g., codec) associated with the camera 126. In general, characteristics of the camera 126 and the image standard define a format of the image 250. Thus, while the particular characteristics can vary according to different implementations, in general, the image 250 has a defined resolution (i.e., height and width in pixels) and format. Thus, for example, the monocular image 250 is generally an RGB visible light image. In further aspects, the image 250 can be an infrared image associated with a corresponding infrared camera, a black/white image, or another suitable format as may be desired. Whichever format that MDE component 180 implements, the image 250 is a monocular image in that there is no explicit additional modality indicating depth. In contrast to a stereo image that may integrate left and right images from separate cameras mounted side-by-side, the monocular image 250 does not include explicit depth information such as disparity maps derived from comparing the stereo images pixel-by-pixel.

Figure 3B:
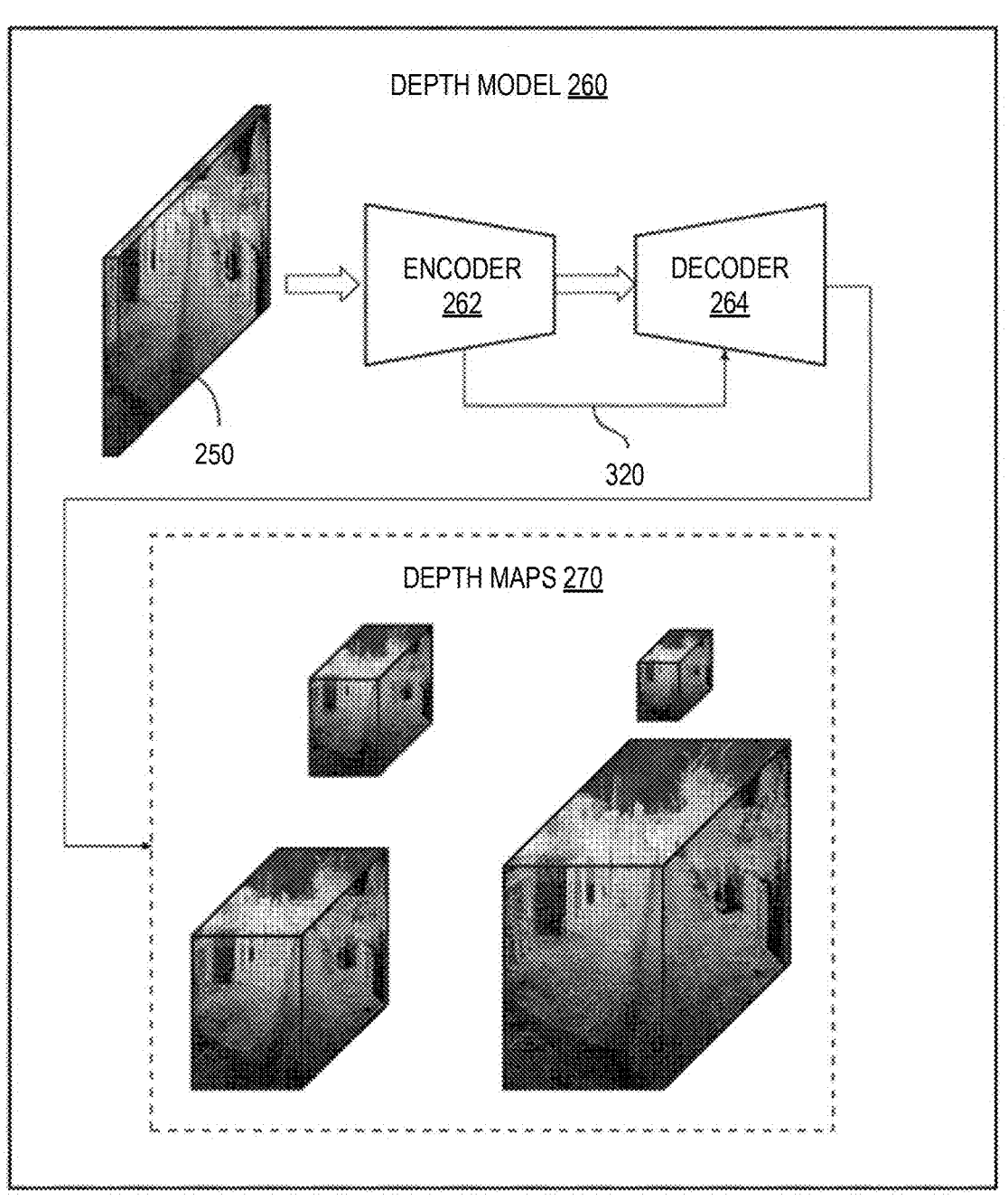
FIG. 3B illustrates an example depth model that can be used by the MDE component of FIG. 3A in accordance with some embodiments

Instead, the monocular image 250 implicitly provides depth information in the relationships of perspective and size of elements depicted in the image 250 from which the depth component 220 derives the depth map 270 by using the depth model 260. The depth map 270 is, in one embodiment, a data structure corresponding to the image 250 that indicates distances/depths to objects/features represented therein. With reference to FIG. 3B, one embodiment of the depth model 260 is illustrated. In particular, the illustrated form of the model 260 identifies an exemplary flow of a processing channel formed by the model 260 for processing monocular images such as image 250. It should be appreciated that the depth model 260 is generally a machine learning algorithm/model that may be broadly characterized as a convolutional neural network (CNN) or as an encoder/decoder architecture including convolutional components.

The monocular image 250 is provided as an input into the depth model 260. The depth model 260, in one embodiment, includes an encoder 262 that accepts the image 250 as an electronic input and processes the image 250 to extract features from the image 250. The features are, in general, aspects of the image that are indicative of spatial information that is intrinsically encoded therein. As such, encoding layers that form the encoder 262 function to fold (i.e., adapt dimensions of the feature map to retain the features) encoded features into separate channels, iteratively reducing spatial dimensions of the image while packing additional channels with information about embedded states of the features. Thus, the addition of the extra channels avoids the lossy nature of the encoding process and facilitates the preservation of more information (e.g., feature details) about the original monocular image 250.

Accordingly, the encoder 262 is comprised of multiple encoding layers formed from a combination of two-dimensional (2D) convolutional layers, packing blocks, and residual blocks. Moreover, the separate encoding layers generate outputs in the form of encoded feature maps (also referred to herein as tensors), which the encoding layers provide to subsequent layers in the model 260. Thus, the encoder 262 includes a variety of separate layers that operate on the monocular image 250, and subsequently on derived/intermediate feature maps that convert the visual information of the monocular image 250 into embedded state information in the form of encoded features of different channels. In this way, the encoder 262 avoids loss of information as may occur in traditional approaches that use striding and pooling layers. In any case, the output of the encoder 262 is, in one approach, a feature map having a particular dimension (e.g., 512×H/32×W/32) that is transformed in relation to the image 250 (e.g., 3×H×W) as a function of the various encoding layers packing the features into additional channels.

The depth model 260 further includes the decoder 264. In one embodiment, the decoder 264 unfolds (i.e., adapt dimensions of the tensor to extract the features) the previously encoded spatial information in order to derive the depth map 270 according to learned correlations associated with the encoded features. That is, the decoding layers generally function to up-sample, through sub-pixel convolutions and other mechanisms, the previously encoded features into the depth map 270. In one embodiment, the decoding layers comprise unpacking blocks, two-dimensional convolutional layers, and inverse depth layers that function as output layers for different scales. As previously noted, the disclosed architecture of the encoder 262 includes packing blocks that fold encoded features into additional channels in order to preserve spatial information across the separate layers.

In addition to folding the encoded features into the additional channels, the encoder 262 directly provides residual information to the decoder via skip connections 320. While illustrated as a single connection between the encoder 262 and the decoder 264, in practice, the skip connections 320 are, for example, between multiple layers (e.g., four or more) of the encoder 262 and the decoder 264 in order to convey higher resolution encoded information between the encoder 262 and the decoder 264 thereby facilitating a flow of information (e.g., feature maps and gradients) to improve the depth map 270 (e.g., increase available detail). It should be understood that the description of MDE component 180 and it's component parts is only one example of how MDE may be performed/achieved, and other known or later-developed MDE systems/methods may be used.

Figure 4:
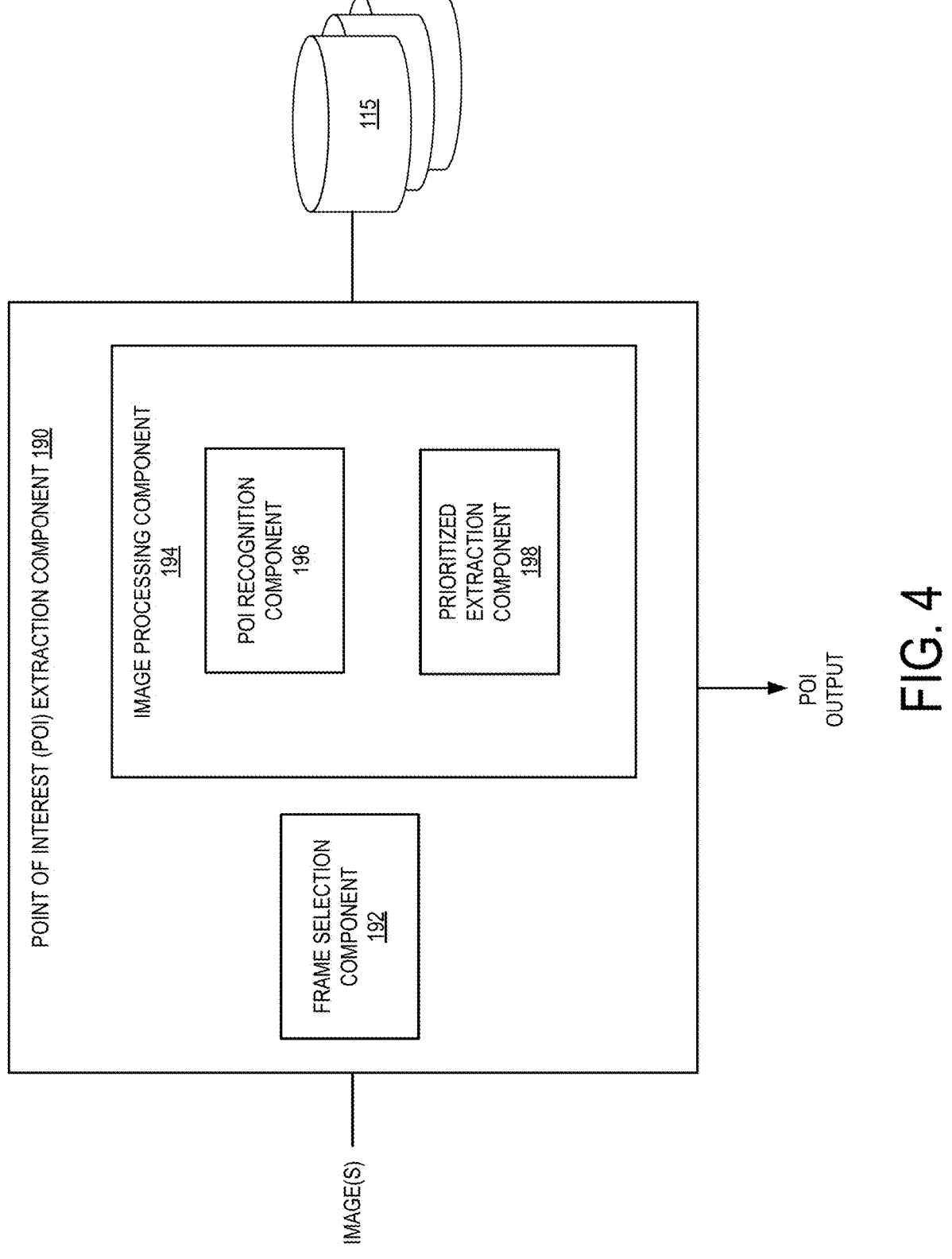
FIG. 4 illustrates an example architecture of a point of interest (POI) extraction component in accordance with some embodiments.

FIG. 4 illustrates POI extraction component 190 in greater detail. POI extraction component 190 may include a frame selection component 192 and an image processing component 194, which in turn may comprise a POI recognition component 196 and a prioritized extraction component 198.

In the event, POI extraction component 190 receives a series of images/video or some time-series aggregation of images, frame selection component 192 selects frame images sampled at determined intervals from the input images, and supplies the selected images to the image processing component 194. In the event, POI extraction component 190 receives singular images, frame selection component 192 may simply pass the image(s) to image processing component 194. Image processing component 194 recognizes an object in an image(s) through image processing using a neural network (artificial intelligence model), and outputs information indicating the position of the recognized object (hereinafter referred to as a POI) and information indicating what the POI is.

The image processing component 194 functionally includes a POI recognition component 196, and a prioritized extraction component 198. The prioritized extraction component 198 is incorporated to improve the POI recognition accuracy of POI extraction component 190.

As alluded to above, POI extraction component 190 may be used to monitor ambient conditions around the vehicle. Examples of POIs to be recognized by POI recognition component 196 can include, but are not limited to obstacles, objects, roadway infrastructure, and the like, e.g., parking cones, barriers, bicycles, people, signs, and so on. POI recognition component 196 recognizes a POI in the image(s) supplied to it from frame selection component 192 by using, e.g., a neural network trained through deep learning, and generates positional information indicating the position of the recognized POI, an identification label indicating what the POI is, or other identifying information/information characterizing the POI, e.g., physical dimensions, visual characterizations such as color and shape, content (e.g., speed limit value associated with a speed limit sign), etc. The positional information and the identification label of the POI are referred to collectively as POI information.

In some embodiments, a method (for example, You Only Look Once (YOLO) or Single Shot Multibox Detector (SSD)) may be employed as a method for detecting the position of a POI and identifying the POI from an image(s). For example, YOLO is a method for detecting the position of a target and identifying the target by inputting the entire frame or image to a convolutional neural network.

An object in a moving image/series of images typically exhibits a characteristic motion between frames/images. When a motion of a POI between frames/images is identified as the characteristic motion, an assumption can be made that the POI is recognized correctly. The prioritized extraction component 198 improves the recognition accuracy of POI extraction component 190 by extracting a POI that exhibits the characteristic motion with priority among the POIs recognized by target recognition component 196.

In particular, prioritized extraction component 198 may analyze groups of images/frames in defined sets. Prioritized extraction component 198 may determine a motion (positional relationship) of a POI between the frames/images of a set upon detecting position information data of POIs that are assigned a common identification label. POIs identified across multiple sets of frames/images can be linked. It should be understood that when the position detection and identification are correct, the motion of a POI between frames/images exhibits what is referred to as an ambience change feature (and is not exhibited when motion and/or identification labeling is incorrect). When POIs having a common identification label in the frames/images have the ambience change feature in terms of their positional relationships, prioritized extraction component 198 extracts the POIs with priority over POIs having no ambience change feature, and causes POI extraction component 190 to output POI information on the extracted POIs. For example, POI information may be transmitted to data store 115 or other appropriate data store, or POI information may be transmitted to decision component 210 (FIG. 2). For example, decision component 210 may make a determination to warn a driver/present some notification indicating to the driver that an object identified and extracted by POI extraction component 190, is upcoming, and should be avoided or maneuvered around.

Figure 5:
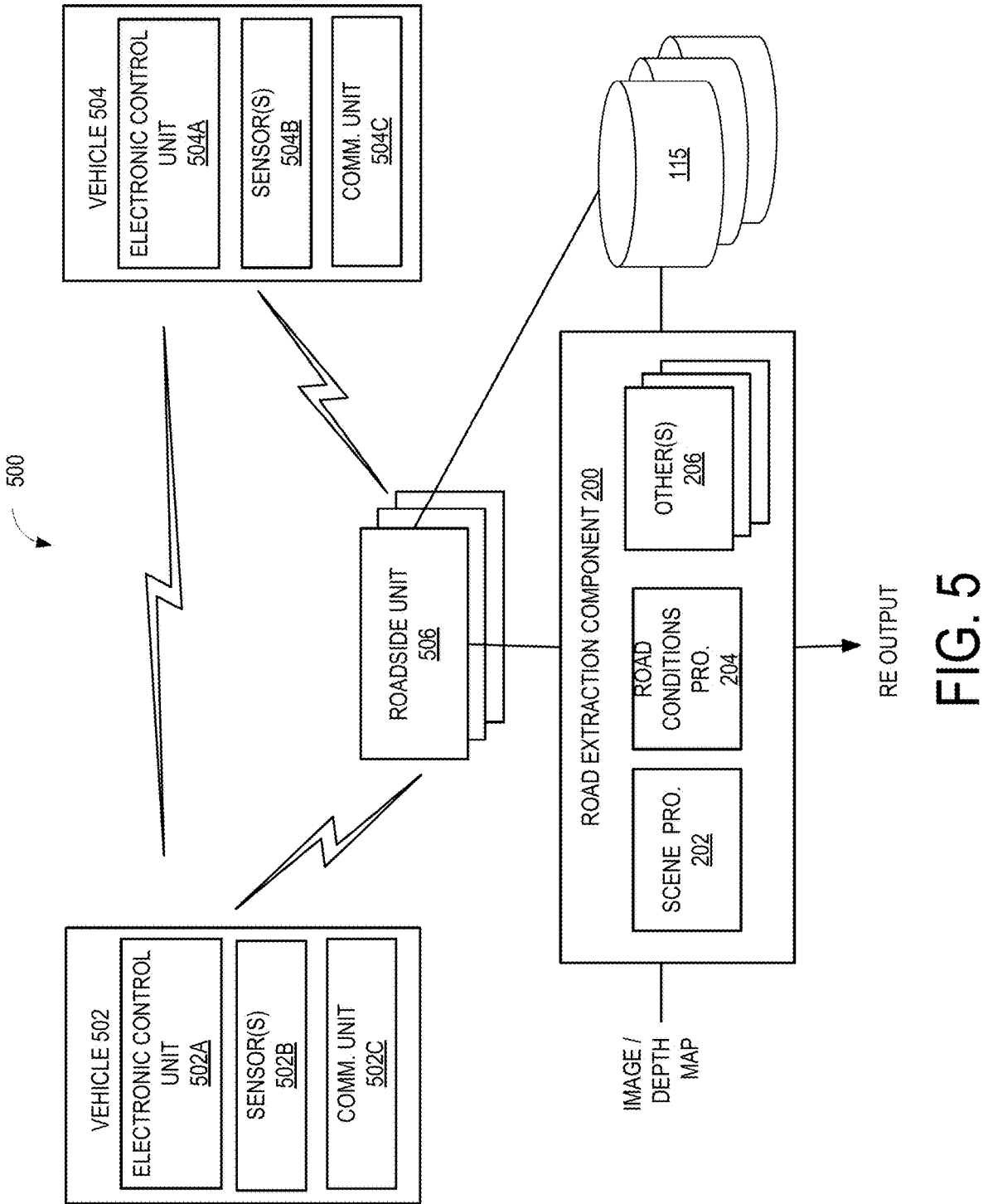
FIG. 5 illustrates an example road extraction (RE) system in accordance with some embodiments.

A system 500 for determining/extracting road segments from one or more images, e.g., images of a scene(s) captured by a vehicle sensor 121, such as camera(s) 126, is illustrated in FIG. 5. Roadside units (or infrastructure) 506 may provide information regarding a particular segment(s) of roadway, typically, proximate to such roadside units 506, where the one or more roadside units 506 may be various types of communications nodes in a vehicular communication network, such as a V2I communications network. The one or more roadside units 506 may be configured to operate as, e.g., dedicated short-range communications devices. In some embodiments, the one or more roadside units 506 may communicate with other roadside units, as well as with one or more other entities. Those entities may be information providers that disseminate, e.g., traffic-related information, roadway conditions information, location, and the like, that the one or more roadside units 506 may forward to vehicles and/or retain as information, e.g., road conditions, to be used in various embodiments, e.g., by road extraction component 200.

System 500 may also include one or more vehicles, e.g., vehicle 502 and vehicle 504. Each of vehicles 502 and 504 may transmit their respective operating conditions to at least one of the one or more roadside units 506. In some embodiments, operating conditions of vehicles 502 and 504 may be sent to more than one element of system 500. This may be done, for example, to provide redundancy and/or to provide multiple sources of information that can be compared or used as a way to verify the validity of received information, as well as increase accuracy of the information. Moreover, the use of multiple roadside units to collect current operating conditions allows the operating conditions of a vehicle to be characterized over a greater period of time/greater distance. In this way, the current operating conditions that are collected can reflect what a vehicle is doing prior to reaching an intersection, while the vehicle is at/passes through the intersection, as well as what the vehicle is doing after traversing the intersection, and ultimately provide information useable to identify a relevant road segment(s).

Each of vehicles 502 and 504 may also have communication units 502C and 504C, respectively, e.g., wireless/radio frequency-based communications units for communicating with one or more elements of system 500 and/or each other. Vehicles 502 and 504 may communicate with each other for the purposes of sharing their respective operating conditions, which in turn may be used to verify or confirm whether or not vehicles are experiencing, e.g., slow-downs. Communications may be short-range, medium-range, and/or long-range-based communications, and may involve communications over one or more networks, such as Bluetooth, Wi-Fi, cellular, vehicular, and other networks. In some embodiments, communications between vehicles (V2V communications) or with the one or more roadside units 506, can be effectuated using, at least in part, on board units configured to communicate over dedicated short-range communications channels. An example of dedicated short-range communications channels are channels in the 5.9 GHz band allocated for use by intelligent transportation systems.

Road extraction component 200 may receive information from vehicles 502, 504 or roadside units 506. Road segmentation and extraction component 200 may also receive images or depth maps from one or more vehicle sensors 121 (such as camera(s) 126) or from MDE component 180. Road extraction component 200 may include a scene processing component 202, a road conditions processing component 204, and may include other processing or analyzation components 206, e.g., an aggregator component that receives data, such as aspects of a particular road segment, lane information, markings, etc., and combines such data to determine road segments that can be extracted.

Scene processing component 202 may process received information, images, depth maps representative or indicative of a road segment, through the use of various detectors, e.g., lighting detector, weather detector, object detector (information from POI extraction component 190 may provide such information as well), and so on. Such detectors may rely on one or more appropriate vision algorithms, e.g., a location detector may identify the location or type of location associated with a road segment captured as part of an image/depth map. In other words, scene processing component 202 may analyze an image/depth map to identify aspects of the image/depth map representative of a road segment. That information may be output to decision component 210 (as noted above) and used to determine whether or not some action should be taken, e.g., evasive maneuvering, warning notifications, etc. For example, and as alluded to above, road segment information may be used to filter out non-POI elements of an image or depth map, so that a driver or autonomous driving component 160 (FIG. 1) or navigation system 147, may accurately or properly assess (and potentially respond to) a scenario or condition reflected in the image/depth map.

A road conditions processing component 204, based on the aforementioned image/depth map or other information received as input, may estimate or determine relevant road conditions for a particular road segment. That is, road conditions processing component 204 may determine whether a particular segment of road is dry/normal, wet, slippery, flooded, and so on. Characteristics such as these may be used to build a classification or profile for the road segment made up of relevant parameters that may be used as image analysis parameters (as discussed above), or that may be used to generate relevant image analysis parameters. There may be other components or processing components that make up road extraction component 200, e.g., other components 206, other analysis or machine learning/artificial intelligence components adapted to process scene/road conditions information gleaned by system 500. Moreover, decision component 210 may extract or remove a road segment when that road segment is deemed to be irrelevant to current or upcoming vehicle operation. For example, a road segment with a pothole may be deemed relevant to consider by decision component 210, and thus, parameters regarding such a road segment may be stored, e.g., for use when another vehicle encounters the same road segment. On the other hand, an obstacle-free road segment may be deemed to be irrelevant to current or upcoming vehicle operation, in which case, representation of the road segment in an adjusted depth map may be eschewed.

In some embodiments, as alluded to above, road segment parameters (e.g., lighting, locality, weather conditions, scene-level contextual information, etc. characterizing the road segment at issue) may be transmitted to/stored at an appropriate data store 115, or partition(s) thereof. In some embodiments, as alluded to above, road extraction information may be output from road extraction component 200 for use by decision component 210.

Figure 6B:
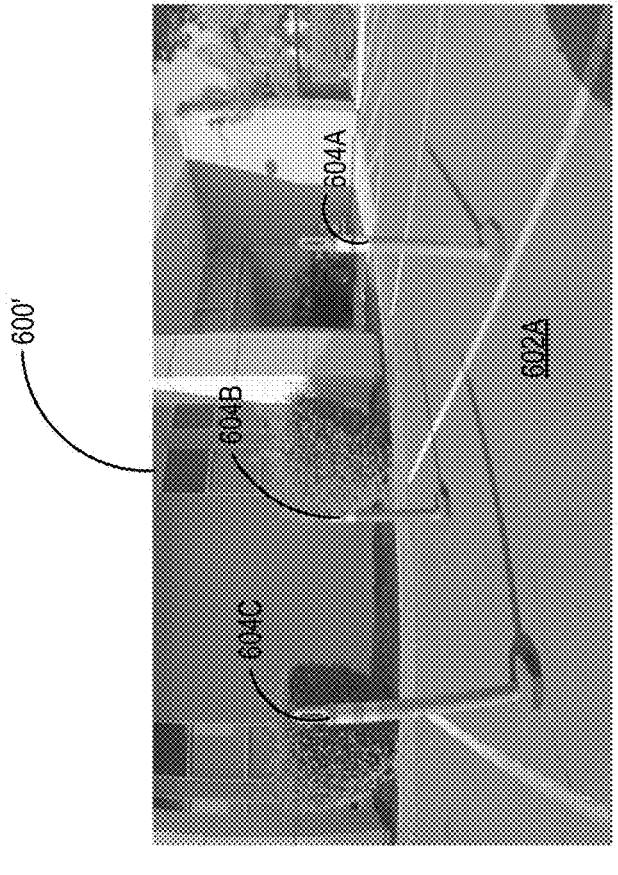
FIGS. 6A and 6B illustrate an example use of an embodiment of the systems and methods disclosed herein.
Figure 6A:
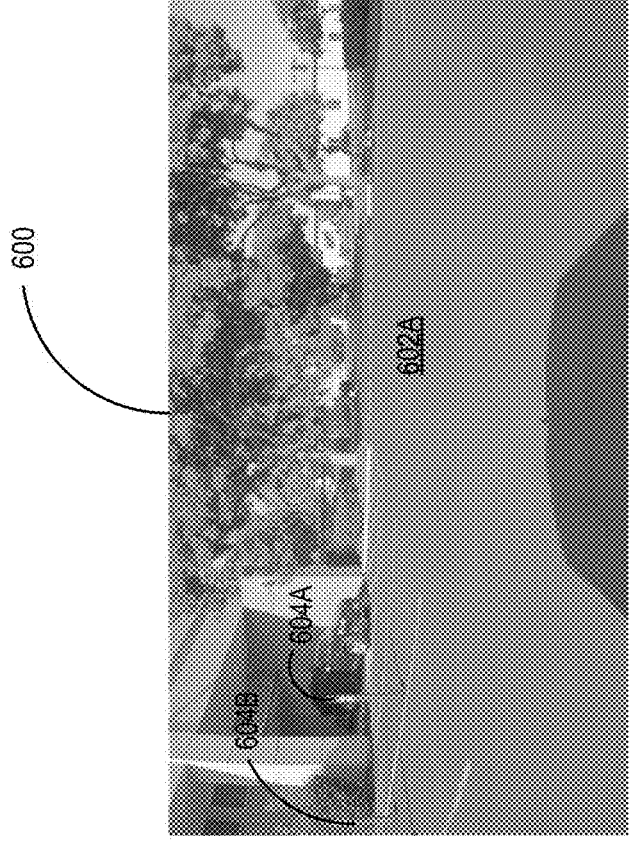

FIGS. 6A and 6B illustrate an example scenario in which embodiments of the disclosed technology may be used, and will be described in conjunction with FIG. 7, which illustrates example operations for MDE assistance and augmentation. FIG. 6A illustrates an example depth map 600 generated pursuant to a color image capture of some scene or environment in which a vehicle may be operating/located. Thus, at operation 700 of FIG. 7, a depth map is generated from an image of a scene. As noted above, sensors such as camera(s) 126 (or other sensors/devices) may capture a color image or representation of the scene. A depth map may then be generated using MDE, e.g., MDE component 180 may convert the color image into a depth map, where objects or aspects of the color image are represented in gray scale, with pixel values corresponding to distance relative to the camera(s) that captured the color image.

It can be appreciated that FIG. 6A may be an example of a depth map generated by a backup camera of a vehicle as it approaches a desired parking spot.

Figure 7:
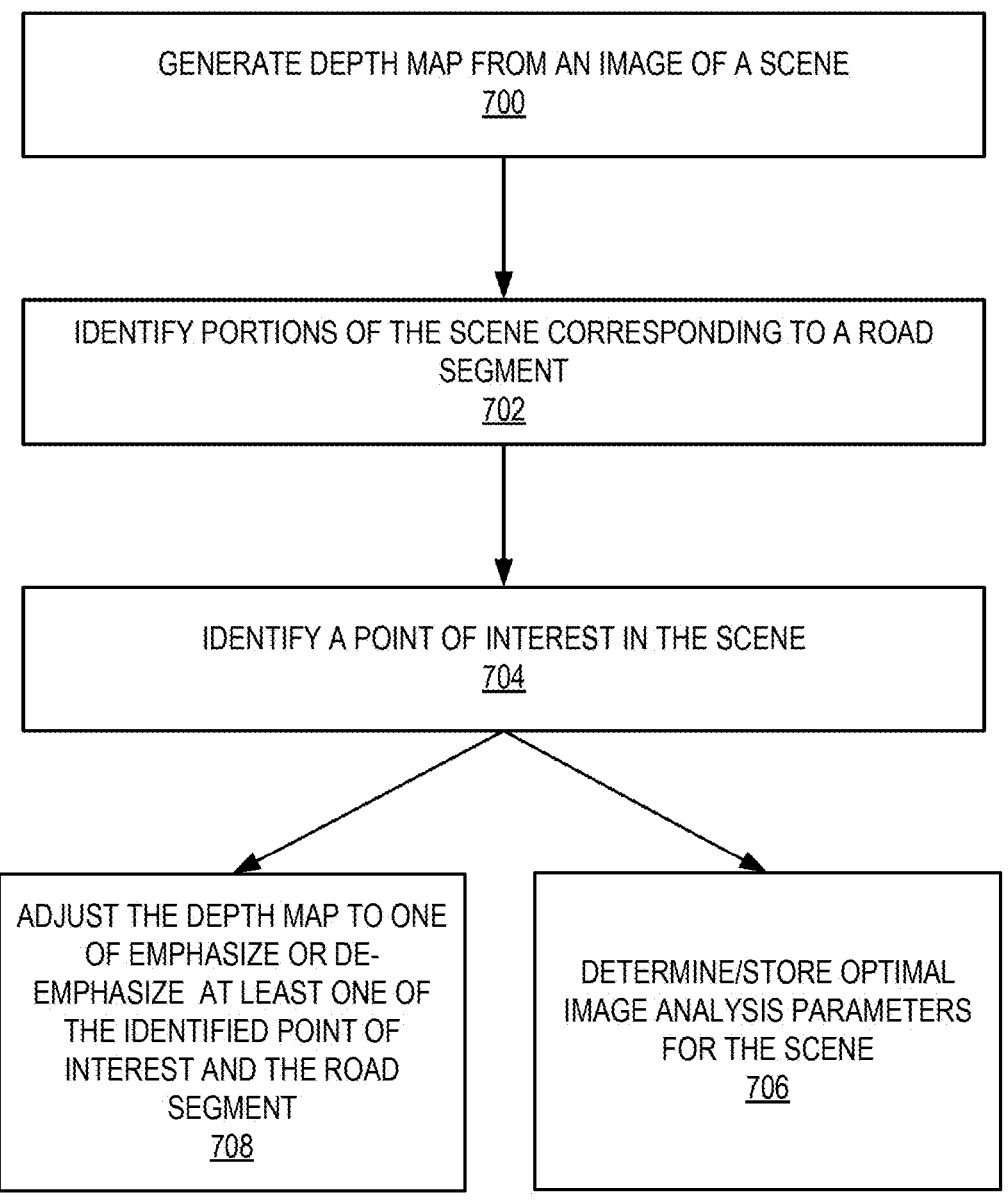
FIG. 7 is a flow chart illustrating example operations for effectuating MDE parameter assistance and augmentation.

At operation 702 of FIG. 7, one or more portions of the scene corresponding to a road segment are identified. Referring back to FIG. 6A, it can be appreciated that road extraction component 200 (FIG. 2) recognizes, based on image/depth map information input thereto, that road segments in the scene include road section 602A. Point of interest extraction component 190 (FIG. 2) may recognize the presence of pylons/posts 604A, 604B, and 604C. That is, and as set forth in FIG. 7, at operation 704, one or more points of interest are identified in the scene, in this example, the existence of physical parking guides in the form of the aforementioned posts/pylons 604A-C.

As noted above, in some embodiments, decision component 210 (FIG. 2) may determine, based on information or data, such as sensor data from one or more sensors of sensor system 120 (FIG. 1), or information/data from an information provider vis-h-vis input system 130, an optimal parameter(s) for adjusting or adapting an MDE depth map (such as one generated by MDE component 180). Although not limited to use with/for a camera, such as camera(s) 126, typical pose and depth estimations can be adapted in accordance with such optimal parameters. Such parameters may include intrinsic or extrinsic information, e.g., extrinsic parameters may define the location/orientation of camera(s) 126 relative to a captured scene (world frame or perspective), and intrinsic parameters may allow for the mapping between camera coordinates and pixel coordinates of a captured image/image frame. The optimal parameters may facilitate the adaptation or generation of intrinsic parameters. For example, and following the example of FIGS. 6A and 6B, depending on conditions, such as environmental conditions, the intrinsic parameters may need to be changed. For example, any environmental conditions that may blur or otherwise make for inaccurate depth map distance estimation, e.g., fog, rain, dust, etc. can be accounted for in optimal parameters and saved, e.g., in a cloud-based/remote data store, e.g., data store 115. Other vehicles encountering similar conditions or in the same/similar location, can leverage the optimal information, e.g., weighting parameters, adjustment parameters, calibration parameters, and so on, and be used to adapt the intrinsic parameters. In other words, decision component 210 can generate optimal parameters to replace extrinsic/intrinsic parameters, or adapt extrinsic/intrinsic parameters relative to current or default extrinsic/ intrinsic parameters. For example, the amount of distance between a vehicle and an obstacle can be different depending on environmental conditions, and thus, default/one set of intrinsic parameters may not yield an accurate mapping. For example, time of day may affect camera(s) 126's perception of a scene, e.g., night-time perception of an object, may be further than perceived because the lack of contrast during night-time conditions may skew resulting depth estimation. Decision component 210, based on information/data it has gleaned regarding current conditions of a vehicle or conditions in which the vehicle is operating, can generate optimal or optimization parameters to account for such conditions such that accurate mapping can occur. This is, optimal (image analysis) parameters may be or act to offset current or default operating conditions of a camera/other sensor(s). In some embodiments, the optimal parameters may be used to offset aspects of a generated depth map, i.e., adjust the depth map in accordance with the optimal parameters. Thus, at operation 706, optimal image analysis parameters for the scene may be determined/stored.

Referring back to FIGS. 6A and 6B, it can be appreciated that a typical depth estimation map (reflected by FIG. 6A) is monochrome, and details therein may be difficult to discern. However, at operation 708, the depth map may be adjusted to one of emphasize or de-emphasize at least one of the identified point of interest and the road segment. That is, and as can be appreciated, road segment 602A may be identified and extracted, in this example, by virtue of being excluded from a highlighting operation. In other words, decision component 210 may receive inputs from road extraction component 200 and POI extraction component 190, and determine that road segment 602A is not relevant to navigating the current environment. In contrast, posts 604A-C may be recognized as POIs, and decision component 210 may determine to optimize or adjust the depth map by highlighting (in this case, adding original or other color back to) posts 604A-604C. It may be appreciated that in this example, post 604C appears to be nearest to the vehicle, in which case, its highlighting may reflect such priority/importance, e.g., by highlighting in a brighter/more noticeable color, whereas post 604A (which is positioned in an adjacent parking spot, and thus less important) is highlighted in a manner that reflects a lower priority. Various ways/mechanisms for adjusting a depth map/image are contemplated in accordance with different embodiments, as would be understood by those having skill in the art.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 8. Various embodiments are described in terms of this example-computing component 800. After reading this description, it will become apparent to a person skilled in the relevant art how to implement the application using other computing components or architectures.

Referring now to FIG. 8, computing component 800 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 800 might also represent computing capabilities embedded within or otherwise available to a given device. For example, a computing component might be found in other electronic devices such as, for example, portable computing devices, and other electronic devices that might include some form of processing capability.

Computing component 800 might include, for example, one or more processors, controllers, control components, or other processing devices. This can include a processor, and/or any one or more of the components making up vehicle 100, depth system 170, or any components/aspects thereof. Processor 804 might be implemented using a general-purpose or special-purpose processing engine such as, for example, a microprocessor, controller, or other control logic. Processor 804 may be connected to a bus 802. However, any communication medium can be used to facilitate interaction with other components of computing component 800 or to communicate externally.

Computing component 800 might also include one or more memory components, simply referred to herein as main memory 808. For example, random access memory (RAM) or other dynamic memory, might be used for storing information and instructions to be executed by processor 804. Main memory 808 might also be used for storing temporary variables or other intermediate information during execution of instructions to be executed by processor 804. Computing component 800 might likewise include a read only memory ("ROM") or other static storage device coupled to bus 802 for storing static information and instructions for processor 804.

The computing component 800 might also include one or more various forms of information storage mechanism 810, which might include, for example, a media drive 812 and a storage unit interface 820. The media drive 812 might include a drive or other mechanism to support fixed or removable storage media 814. For example, a hard disk drive, a solid-state drive, a magnetic tape drive, an optical drive, a compact disc (CD) or digital video disc (DVD) drive (R or RW), or other removable or fixed media drive might be provided. Storage media 814 might include, for example, a hard disk, an integrated circuit assembly, magnetic tape, cartridge, optical disk, a CD or DVD. Storage media 814 may be any other fixed or removable medium that is read by, written to or accessed by media drive 812. As these examples illustrate, the storage media 814 can include a computer usable storage medium having stored therein computer software or data.

In alternative embodiments, information storage mechanism 810 might include other similar instrumentalities for allowing computer programs or other instructions or data to be loaded into computing component 800. Such instrumentalities might include, for example, a fixed or removable storage unit 822 and an interface 820. Examples of such storage units 822 and interfaces 820 can include a program cartridge and cartridge interface, a removable memory (for example, a flash memory or other removable memory component) and memory slot. Other examples may include a PCMCIA slot and card, and other fixed or removable storage units 822 and interfaces 820 that allow software and data to be transferred from storage unit 822 to computing component 800.

Computing component 800 might also include a communications interface 824. Communications interface 824 might be used to allow software and data to be transferred between computing component 800 and external devices. Examples of communications interface 824 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 824 may be carried on signals, which can be electronic, electromagnetic (which includes optical) or other signals capable of being exchanged by a given communications interface 824. These signals might be provided to communications interface 824 via a channel 828. Channel 828 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 808, storage unit 820, media 814, and channel 828. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 800 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method, comprising:
generating a depth map from an image of a scene;
identifying a portion of the scene corresponding to a road segment;
identifying a point of interest in the scene;
adjusting the depth map to de-emphasize the road segment;
determining an optimal image analysis parameter for the scene; and
transmitting, to a remote server, the optimal image analysis parameter and a geographic location at which the image was obtained.

2. The method of claim 1, further comprising extracting the road segment from the adjusted depth map.

3. The method of claim 2, wherein adjusting the depth map to de-emphasize the road segment is performed pursuant to extraction of the road segment from the depth map upon identification of the road segment.

4. The method of claim 1, further comprising prioritizing the identification of the point of interest relative to one or more other points of interest.

5. The method of claim 1, further comprising adjusting the depth map to emphasize the identified point of interest, wherein adjusting the depth map to emphasize the identified point of interest comprises highlighting the identified point of interest in a manner that visually emphasizes the identified point of interest to an operator of a vehicle, wherein the vehicle will encounter the identified point of interest while traversing the road segment.

6. The method of claim 1, wherein generating the depth map comprises generating the depth map using a monocular depth estimation (MDE) component based on the image of the scene received from a camera of a vehicle.

7. The method of claim 6, further comprising determining an operational parameter associated with the camera.

8. The method of claim 7, wherein determining the optimal image analysis parameter comprises generating a parameter value to offset at least one of the determined operational parameter and at least one aspect of the generated depth map.

9. The method of claim 8, wherein use of the determined optimal image analysis parameter increases accuracy of the generated depth map.

10. A method, comprising:
receiving, at a first vehicle, an optimal image analysis parameter output by a remote server, the first vehicle traversing a road segment, the received optimal image analysis parameter having been generated pursuant to a second vehicle having previously traversed the road segment;
generating, at the first vehicle, a depth map from an image of a scene; and
adjusting, using the received optimal image analysis parameter, the depth map to de-emphasize the road segment.

11. The method of claim 10, wherein adjusting the depth map to de-emphasize the road segment is performed pursuant to extraction of the road segment from the depth map upon identification of the road segment.

12. The method of claim 10, further comprising prioritizing identification of a point of interest in the scene relative to one or more other points of interest.

13. The method of claim 10, further comprising adjusting the depth map to emphasize an identified point of interest in the scene, wherein adjusting the depth map to emphasize the identified point of interest comprises highlighting the identified point of interest in a manner that visually emphasizes the identified point of interest to an operator of the first vehicle, wherein the first vehicle will encounter the identified point of interest while traversing the road segment.

14. The method of claim 10, wherein generating the depth map comprises generating the depth map using a monocular depth estimation (MDE) component based on the image of the scene received from a camera of the first vehicle.

15. The method of claim 14, further comprising determining an operational parameter associated with the camera.

16. The method of claim 15, wherein the received optimal image analysis parameter comprises a parameter value to offset at least one of the determined operational parameter and at least one aspect of the generated depth map.

17. The method of claim 16, wherein use of the received optimal image analysis parameter increases accuracy of the generated depth map.

18. The method of claim 1, further comprising transmitting the determined optimal image analysis parameter to a remote server.

19. The method of claim 18, wherein the determined optimal image analysis parameter is transmitted to the remote server along with a location of a vehicle, the determined optimal image analysis parameter being associated with the location of the vehicle.

20. The method of claim 18, wherein transmitting the determined optimal image analysis parameter to the remote server is performed by a vehicle.

\* \* \* \* \*